(12) United States Patent
An

(10) Patent No.: US 8,890,012 B2
(45) Date of Patent: Nov. 18, 2014

(54) PORTABLE TERMINAL HAVING SIDE KEY

(71) Applicant: Samsung Electronics Co., Ltd., Gyeonggi-do (KR)

(72) Inventor: Sang-Hoon An, Incheon (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 130 days.

(21) Appl. No.: 13/632,298

(22) Filed: Oct. 1, 2012

(65) Prior Publication Data
US 2013/0081932 A1    Apr. 4, 2013

(30) Foreign Application Priority Data

Oct. 4, 2011    (KR) .......................... 10-2011-0100524

(51) Int. Cl.
| | | |
|---|---|---|
| *H01H 1/64* | (2006.01) | |
| *H01H 1/66* | (2006.01) | |
| *H01H 9/02* | (2006.01) | |
| *H01H 9/06* | (2006.01) | |
| *H01H 13/04* | (2006.01) | |
| *H04M 1/23* | (2006.01) | |

(52) U.S. Cl.
CPC .............. *H01H 13/04* (2013.01); *H04M 1/236* (2013.01)
USPC .......................................... 200/293; 200/341

(58) Field of Classification Search
USPC ........................................................ 200/293
See application file for complete search history.

(56) References Cited

U.S. PATENT DOCUMENTS

| | | | |
|---|---|---|---|
| 8,502,097 B2 * | 8/2013 | Aldana et al. .................. | 200/293 |
| 8,598,479 B2 * | 12/2013 | Quan et al. ..................... | 200/293 |
| 8,604,372 B2 * | 12/2013 | Yang et al. ..................... | 200/341 |

\* cited by examiner

*Primary Examiner* — Renee S Luebke
*Assistant Examiner* — Lheiren Mae A Caroc
(74) *Attorney, Agent, or Firm* — Cha & Reiter, LLC

(57) ABSTRACT

Provided is a portable terminal including a switch button member having binding rings extending from both end portions thereof, respectively, and a case member having a seating groove on an outer circumferential surface of a side portion thereof, in which the button member is disposed on the seating groove and the binding rings are inserted into an inner side of the case member, respectively, so as to bind the switch button to said case member.

9 Claims, 2 Drawing Sheets

PORTABLE TERMINAL HAVING SIDE KEY

CLAIM OF PRIORITY

This application claims the benefit under 35 U.S.C. §119(a) of the earlier filing date of a Korean Patent Application filed in the Korean Intellectual Property Office on Oct. 4, 2011 and assigned Serial No. 10-2011-0100524, the entire disclosure of which is hereby incorporated by reference.

BACKGROUND OF THE INVENTION

1. Field of the Invention

The present invention generally relates to a portable terminal, and more particularly, to a portable terminal including a side key (hereinafter referred to as a "switch") disposed on a side of a case member.

2. Description of the Related Art

Generally, portable terminals are apparatuses capable of performing various functions such as mobile communication, games, multimedia reproduction, schedule management, etc., while being carried by users. Among those portable terminals, a mobile communication terminal provides a function such as voice communication or message transmission between users, and the mobile communication terminal has come into wide use regardless of age or gender. With the development of electronic technologies, functions specialized for individual types of portable terminals, such as games, multimedia, schedule management, Internet access, mobile banking, etc., have been integrated into mobile communication terminals.

Portable terminals typically include various types of input devices. In particular, a keypad is an essential input device for inputting various text information or calling, selecting and executing various menus. Recently, as multimedia functions of the portable terminal are being emphasized, a keypad is being implemented with portable terminals, using a display device having a touch screen function. By providing this dual function, the display device of a portable terminal can contribute to miniaturization of the portable terminal in spite of its size increase to provide the display device. However, it is typical that a power switch or a volume control switch is still implemented through physical manipulation using a dome switch or the like. The switch of the physical-manipulation type provides various functions according to an operational mode of the portable terminal For example, if a 2-way switch is disposed on the portable terminal, the 2-way switch is used for volume control during execution of a multimedia function or voice communication, but in a standby mode, a function such as activation of a display device or indication of a current time may be implemented using the 2-way switch. The 2-way switch is typically disposed on a side of the portable terminal.

FIGS. 1 and 2 are views showing the general structure of a portable terminal, in which a side switch is disposed on a case member of the portable terminal The side switch may be implemented as a 2-way switch.

As shown in FIGS. 1 and 2, a case member 12 includes an elongate-switch hole 15 having a length corresponding to the length of that portion of a side switch 13 that the user of the portable terminal manipulates in order to operate the switch. The switch hole 15 is formed completely through a side 12a of the case member 12 in order to assemble and position side switch 13 in case member 12 in an operable manner. A flange 13a extends from an edge of the side switch 13 to support the side switch 13 on an inner surface of the case member 12. On a second case member 11 coupled to face the case member 12 is formed a support 19 for preventing the side switch 13 from completely going into the case member 12. That is, the side switch 13 is confined not to move outside the case member 12 by means of the flange 13a, and is also prevented from completely entering the case member 12 by means of the support 19. Between the side switch 13 and the support 19 is disposed a switch member 17 such as a dome sheet to generate an input signal in response to manipulation of the side switch 13.

The case member 12 includes, on an inner surface thereof, a step portion formed on a circumference of the switch hole 15 to receive the flange 13a. The step portion formed on the circumference of the switch hole 15 has a depth corresponding to a thickness of the flange 13a, and the thickness of the case member 12 is reduced around the switch hole 15 by the thickness of the flange 13a, more specifically, the thickness of the step portion formed on the circumference of the switch hole 15.

However, when the thickness of the case member 12a is reduced on the circumference of the switch hole to receive the flange formed on the side switch, the strength of the case member 12a on the circumference of the switch hole is reduced, thus being vulnerable to deformation during an assembly process. Moreover, if the case member is deformed during a disassembly or assembly process for repair, etc., the case member itself has to be replaced with another one.

SUMMARY OF THE INVENTION

Accordingly, an aspect of the present invention is to provide a portable terminal including a case member capable of reinforcing rigidity on a circumference of a switch hole.

Another aspect of the present invention is to provide a portable terminal having a side switch which is installed with a stable structure while improving a rigidity of a case member.

According to an aspect of the present invention, there is provided a portable terminal including a switch button member having binding rings extending from both end portions thereof, respectively, and a case member having a seating groove on an outer circumferential surface of a side portion thereof, in which the switch button member is disposed on the seating groove and the binding rings are inserted into an inner side of the case member, respectively, so as to bind the switch button to said case member.

BRIEF DESCRIPTION OF THE DRAWINGS

The above and other features and advantages of the present invention will be more apparent from the following detailed description of an exemplary embodiment taken in conjunction with the accompanying drawings, in which.

DETAILED DESCRIPTION

Hereinafter, an exemplary embodiment of the present invention will be described in detail with reference to the accompanying drawings. The detailed descriptions of functions and configurations incorporated herein that are well known to those skilled in the art will be omitted to avoid unnecessarily obscuring the present invention.

Figure 1:
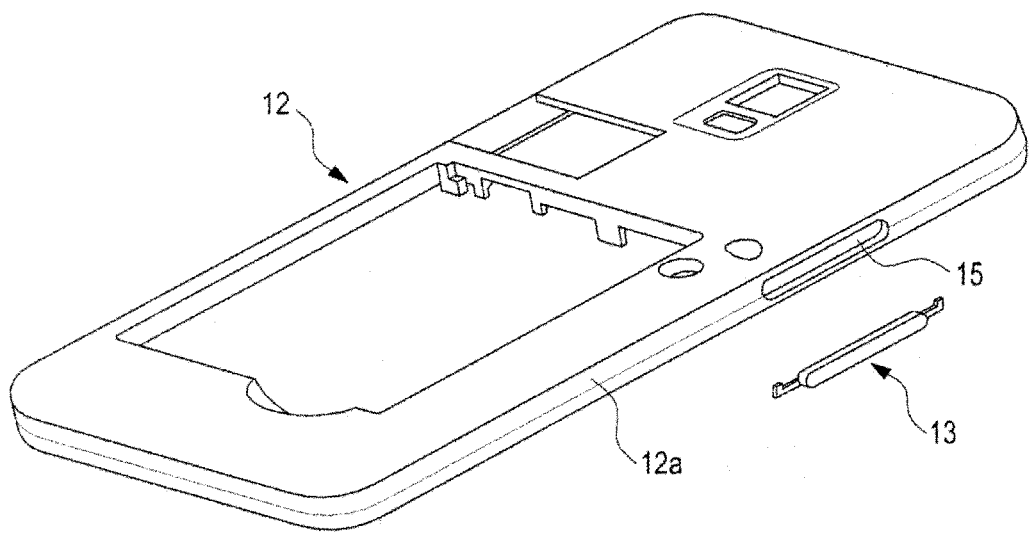
FIG. 1 is an exploded perspective view illustrating an installation structure of a side switch of a prior art portable terminal.
Figure 2:
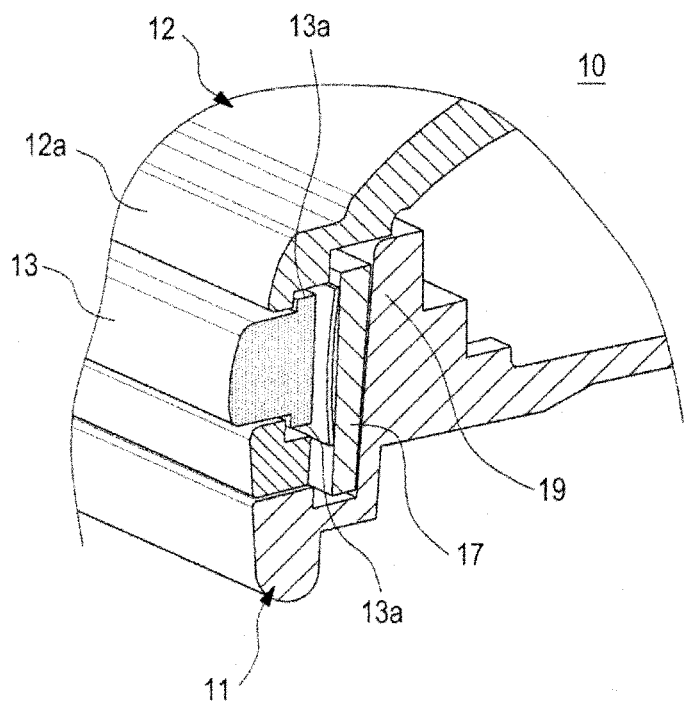
FIG. 2 is a partially-cut away perspective view illustrating the prior art portable terminal shown in FIG. 1.
Figure 3:
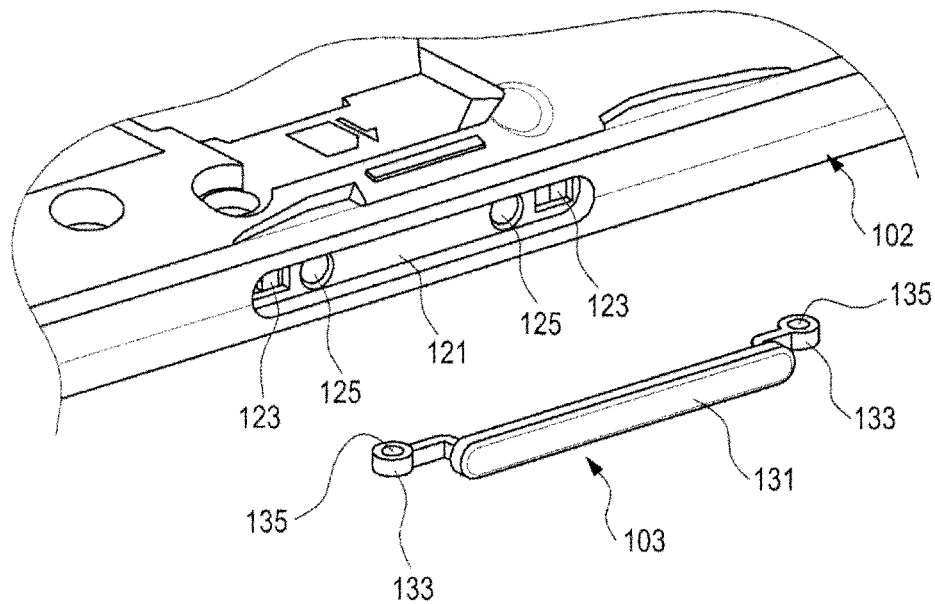
FIG. 3 is an exploded perspective view illustrating a portable terminal according to an embodiment of the present invention.
Figure 4:
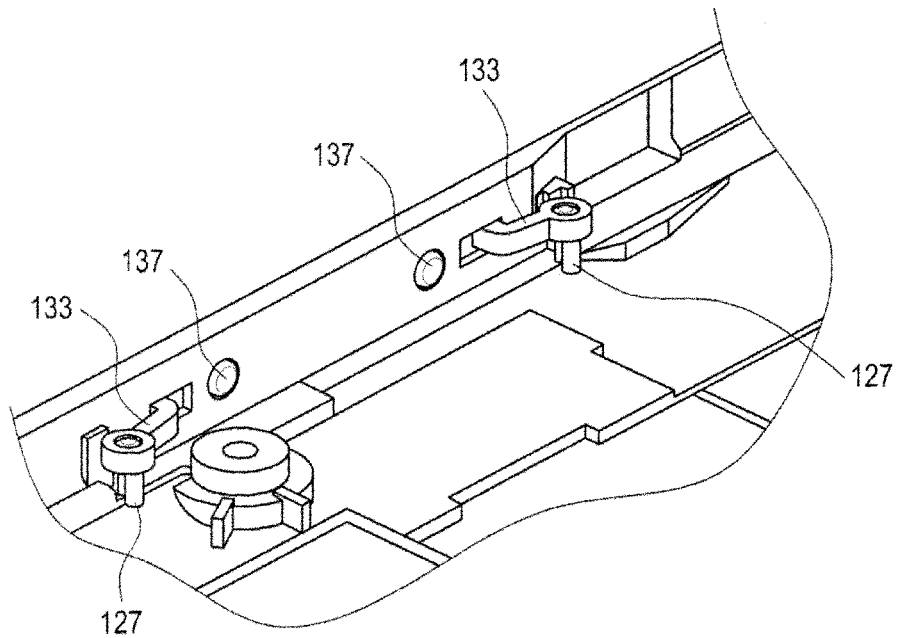
FIG. 4 is a perspective view illustrating a state in which a side switch is installed on a portable terminal shown in FIG. 3.

FIGS. 3 and 4 illustrate a portable terminal according to an embodiment of the present invention, including a case member 102 having a seating groove 121 formed in an outer circumferential surface of a side portion thereof to install therein a side switch 103 having a binding ring 133.

The case member 102 forms a portion of a housing of the portable terminal, and the seating groove 121 is formed by recessing, but not penetrating, a portion of the outer circumferential surface of the side portion of the case member 102. According to the prior art, a switch positioning hole is formed so as to perforate a side of a case member, whereas the seating groove 121 is formed in accordance with the present invention by recessing a portion of the outer circumferential surface of the side portion of the case member 102 at the position where the side switch is to be located. A switch button member 131 forming the side switch 103 is disposed in the seating groove 121, such that the button member 131 is supported by a bottom surface of the seating groove 121.

To prevent the switch button member 131 of the side switch 103 from leaving the seating groove 121, the side switch 103 includes the binding rings 133 formed on the switch button member 131 and binding protrusions 127 are formed on an inner surface of the case member 102. The binding protrusions 127 extend from the inner surface of the case member 102 in parallel with the outer circumferential surface of the side portion of the case member 102, respectively. The binding rings 133 extend from an inner surface of the switch button member 131 at both end portions of the switch button member 131 to be inserted into an inner side of the case member 102. Binding holes 135 are formed at end portions of the binding rings 133 so as to be bound around the binding protrusions 127 when binding rings 133 are at an inner side of case member 102, so as to thereby bind switch button member 131 in an operating position in seating groove 121. In this way, the side switch 103 is supported by the bottom surface of the seating groove 121, thus being prevented from entering the inner side of the case member 102 and from leaving the seating groove 121 by being fixed to the case member 102 by means of the binding rings 133.

Meanwhile, to insert the binding rings 133 into the inner side of the case member 102, a pair of insertion holes 123 is formed in the seating groove 121. The insertion holes 123 are formed at both end portions on the bottom surface of the seating groove 121, respectively, and perforate the case member 102 from the inner side to an outer side of the case member 102. The binding rings 133 at the opposed ends of switch button member 131 are inserted into the inner side of the case member 102 through a respective one of the insertion holes 123. The binding rings 133 protrude from the inner surface of the button member 131 in parallel with each other, and extend in such a direction that their end portions are away from each other. Since the binding holes 135 are positioned at the end portions of the binding rings 133, the binding protrusions 127 are spaced apart at intervals that are larger than those of the insertion holes 123. Therefore, the binding rings 133 are partially supported by an inner circumferential surface of the side portion of the case member 102 and at the same time, the end portions thereof are supported by the binding protrusions 127, thereby fixing the button member 131 to the seating groove 121.

A switch member (not shown), e.g., a dome sheet may be disposed between the seating groove 121 and the button member 131, may be operated by manipulation of the button member 131. The switch member may also be disposed at a position corresponding to the seating groove 121 in the inner side of the case member 102. In the current embodiment, a pair of operating protrusions 137 is disposed on the inner surface of the button member 131. In the seating groove 121, operating holes 125 are formed between the insertion holes 123, such that the operating protrusions 137 protrude into the inner side of the case member 102 through one of the operating holes 125, respectively. A plurality of switch members is disposed in the inner side of the case member 102 at a position corresponding to the seating groove 121, more specifically, at positions corresponding to the operating protrusions 137. Consequently, when a user manipulates the switch button member 131, the switch member is urged to operate by means of the operating protrusion 137, thus generating an input signal.

As mentioned above, the portable terminal having the side switch according to the present invention supports and fixes the side switch by using the binding rings of the side switch and the seating groove, thus removing a need to reduce the thickness of a particular portion of the case member for installation of the side switch. Therefore, the rigidity of the case member can be improved and the side switch can also be installed stably.

In the portable terminal structured as described above, by forming the seating groove for installation of the side switch, instead of a switch hole, the side switch is supported by the bottom surface of the seating groove. Therefore, it is not necessary to reduce the thickness of the case member at a particular portion such as a circumference of the switch hole, improving the rigidity of the case member. Accordingly, it is possible to prevent the case member from being damaged or deformed during an assembly or repair process. Moreover, the binding rings formed on the side switch can be bound to the inner side of the case member, thereby stably installing the side switch on the portable terminal.

While the invention has been shown and described with reference to an exemplary embodiment thereof, it will be understood by those skilled in the art that various changes in form and details may be made therein without departing from the scope of the invention as defined by the appended claims and their equivalents.

What is claimed is:

1. A portable terminal comprising:
   a switch button member comprising binding rings extending from both end portions thereof, respectively;
   a case member having a seating groove formed on an outer circumferential surface of a side portion thereof; and
   insertion holes formed in the seating groove so as to perforate the case member from an inner side to an outer side of the case member,
   wherein the switch button member is disposed on the seating groove and the binding rings are inserted into the inner side of the case member, respectively, so as to bind the switch button to said case member, and a respective one of each of the binding rings are inserted into the inner side of the case member through a corresponding one of the insertion holes.

2. The portable terminal of claim 1, further comprising binding protrusions formed at positions adjacent to the seating groove on the inner side of the case member,
   wherein a respective one of each of the binding rings are bound to a corresponding one of the binding protrusions.

3. The portable terminal of claim 1, further comprising:
   at least a pair of operating protrusions formed on an inner surface of the switch button member; and
   operating holes formed in the seating groove, wherein a respective one of each of the pair of operating protrusions protrude into the inner side of the case member through a corresponding one of the operating holes.

4. The portable terminal of claim 3, wherein the binding rings extend from an inner surface of the switch button member, and the operating protrusions are disposed between the binding rings.

5. The portable terminal of claim 3, wherein the operating holes are formed between the insertion holes in the seating groove.

6. The portable terminal of claim 5, further comprising binding protrusions formed at positions adjacent to the seating groove on the inner side of the case member,
wherein a respective one of each of the binding rings are bound to a corresponding one of the binding protrusions in the inner side of the case member.

7. The portable terminal of claim 6, wherein the binding protrusions are spaced apart at intervals that are larger than those of the insertion holes.

8. The portable terminal of claim 1, wherein the seating groove is formed by recessing a portion of the outer circumferential surface of the side portion of the case member.

9. The portable terminal of claim 1, wherein the binding rings protrude from an inner surface of the switch button member in parallel with each other and extend in such a direction that their end portions are away from each other.

* * * * *